United States Patent
Laudano et al.

(10) Patent No.: US 8,727,662 B2
(45) Date of Patent: May 20, 2014

(54) INFLUENT LIQUID TREATMENT SYSTEM

(76) Inventors: John M. Laudano, Middletown, CT (US); Richard E. Couch, Milford, CT (US)

( * ) Notice: Subject to any disclaimer, the term of this patent is extended or adjusted under 35 U.S.C. 154(b) by 227 days.

(21) Appl. No.: 13/132,678

(22) PCT Filed: Dec. 4, 2009

(86) PCT No.: PCT/US2009/066749
§ 371 (c)(1),
(2), (4) Date: Aug. 23, 2011

(87) PCT Pub. No.: WO2010/065840
PCT Pub. Date: Jun. 10, 2010

(65) Prior Publication Data
US 2011/0290712 A1 Dec. 1, 2011

Related U.S. Application Data

(60) Provisional application No. 61/119,898, filed on Dec. 4, 2008, provisional application No. 60/992,762, filed on Dec. 6, 2007.

(51) Int. Cl.
*E02B 11/00* (2006.01)
(52) U.S. Cl.
USPC ............ 405/36; 405/43; 405/45; 210/170.08
(58) Field of Classification Search
USPC ............... 405/36, 38, 43–47, 51; 210/170.08, 210/532.2
See application file for complete search history.

(56) References Cited

U.S. PATENT DOCUMENTS

| | | | | |
|---|---|---|---|---|
| 5,458,436 A | * | 10/1995 | Plowman et al. | 405/36 |
| 5,573,349 A | * | 11/1996 | Paoluccio | 405/52 |
| 5,597,264 A | * | 1/1997 | Laak | 405/36 |
| 5,770,071 A | | 6/1998 | Drewery | |
| 6,902,667 B1 | | 6/2005 | Dunne | |
| 7,144,509 B2 | | 12/2006 | Boyd et al. | |
| 8,142,106 B2 | * | 3/2012 | Couch et al. | 405/36 |
| 2005/0205495 A1 | * | 9/2005 | Barrett et al. | 210/688 |
| 2006/0266690 A1 | | 11/2006 | Adams | |
| 2007/0240975 A1 | | 10/2007 | Foret | |
| 2009/0145830 A1 | * | 6/2009 | Couch et al. | 210/170.08 |

* cited by examiner

*Primary Examiner* — Sean Andrish
(74) *Attorney, Agent, or Firm* — MKG, LLC

(57) ABSTRACT

A system for treating influent liquid includes a treatment module having an elongated member arranged in a predetermined configuration. The elongated member has a core structure wrapped in a fabric configured for the passage of the influent liquid therethrough. Filter field medium is disposed about open areas defined by the predetermined configuration of the elongated member and is configured for receiving the influent liquid from the elongated member and passing the influent liquid therethrough. A bladder containing the treatment module has an outlet for providing treated influent liquid passing through the filter medium. A distribution conduit is coupled to the bladder and has an outlet for distributing the influent liquid to the elongated member.

10 Claims, 12 Drawing Sheets

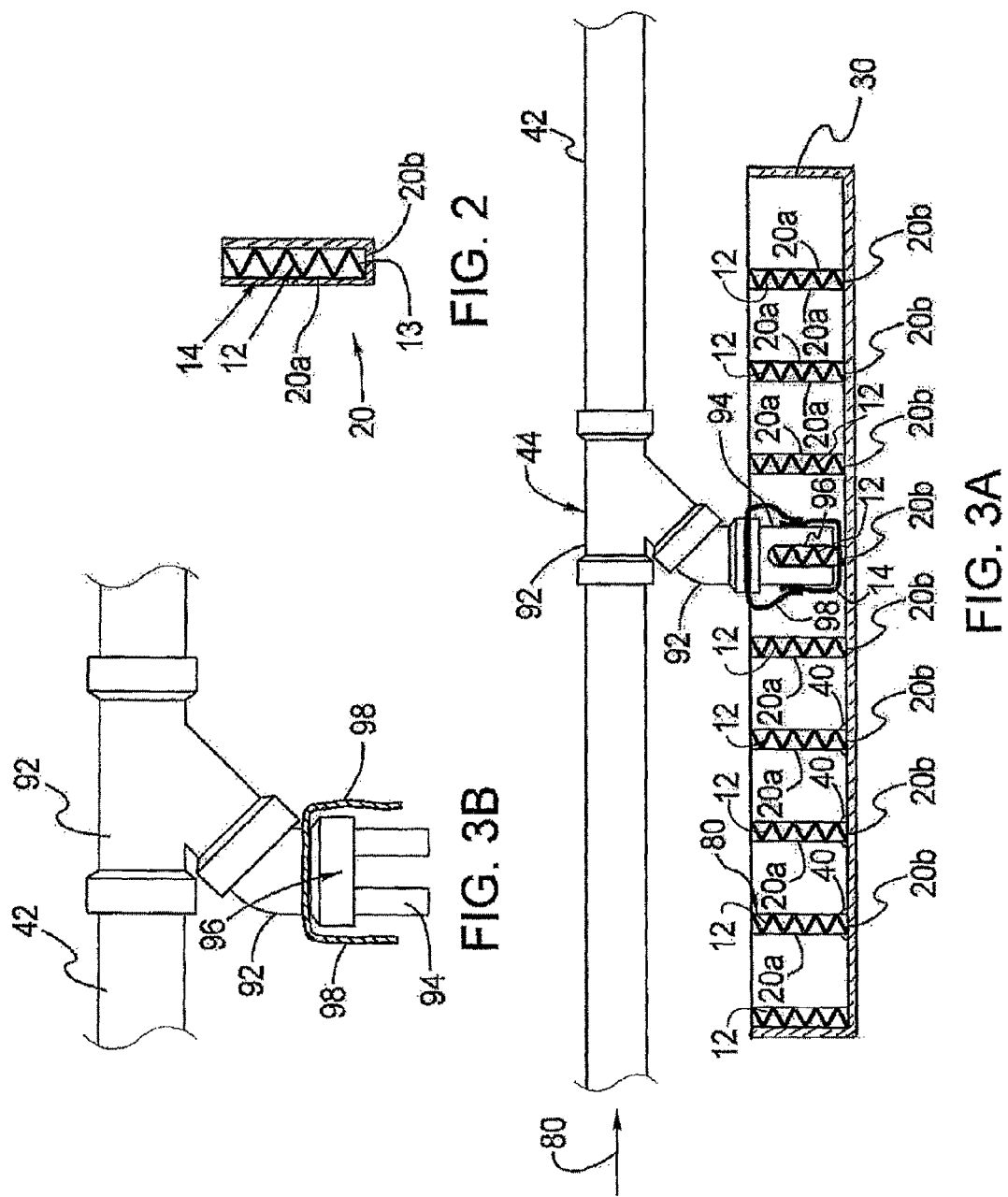

INFLUENT LIQUID TREATMENT SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to systems for the treatment of influent liquid such as non-potable surface, ground and waste water and, more particularly, relates to a modular, portable, self-contained influent liquid treatment system that provides improved distribution and treatment of non potable liquid within a filter field of the system. In one embodiment, influent treatment system is detectable, when buried, within the filter field for post installation location and inspection. In other embodiments, the system is not buried and is fully contained for portability to any location.

2. Related Art

Water treatment systems have a functionality that is similar to septic systems, also known as subsurface sewage disposal/wastewater treatment systems. Water treatment, as described herein, is derived in part from systems used to treat influent liquids such as, for example, non potable water and waste water from individual residences, businesses, schools, churches, military bases, or like residential and/or commercial structures. Influent liquid may also include water originating from natural, non sanitary sources such as, for example, rivers, streams, non-treated and unprotected sources, which can be used as a source to the inventive influent liquid treatment systems as described herein, to provide at output of the system, potable water for more sanitary use and consumption.

Conventionally, in the treatment of sewage and wastewater by septic systems, solid and liquid waste from structures, is collected in a septic tank. Because of the different densities of solid and liquid waste, the solid and liquid components of the sewage separate. The solid material is at least partially decomposed within the tank by the action of aerobic, facultative and anaerobic bacteria, resulting in a liquid effluent. The liquid effluent, which may contain suspended solids, is then conveyed out of the tank and distributed through an area of subterranean soil, which is typically referred to as a drain or leach field. The liquid effluent is passed to a series of stone or sand trenches or chambers within the leach field. The effluent percolates through the chambers and soil for treatment to reduce contaminants before being mixed with the underground water table. The inventors have realized that these traditional treatment and disposal techniques, wherein effluent is discharged into a traditional leach field, with modifications as described herein, can be utilized to treat influent liquids such as, non potable water, through a filter field.

As can be appreciated, it is desirable to minimize installation costs and to extend the useful life of an influent liquid treatment system to minimize maintenance and repair costs. It is also desirable to maximize the density of treatment surfaces within each linear unit of filter field length to ultimately reduce or at least minimize the filter field area. It is further desirable to maximize the filter field's ability to evenly distribute influent liquid across the full expanse of treatment surface provided by the filter field components. It is additionally advantageous, in some conditions, to provide subsurface components that are modular, portable and can be detected above the surface to permit post installation location for inspection and/or future maintenance.

SUMMARY OF THE INVENTION

The present invention resides in one aspect in a modular, portable treatment system for treating influent liquid. The system includes a treatment module, a bladder containing the treatment module, and a distribution conduit coupled to the bladder. The treatment module includes an elongated member arranged in a predetermined configuration and filter field medium disposed about open areas defined by the predetermined configuration of the elongated member. The elongated member includes a core structure wrapped in a fabric. The bladder includes an outlet for providing treated influent liquid from the system. The distribution conduit has an outlet for distributing the influent liquid to the treatment module.

In one embodiment, the modular and portable influent liquid treatment system treats non potable water originating from any source including, for example, effluent passed from a septic tank, and liquid from natural sources such as rivers, streams, and the like.

In one embodiment, the predetermined configuration of the elongated member includes a serpentine-shaped form. In another embodiment, the predetermined configuration of the elongated member includes a ladder-shaped form. In one embodiment, the modular treatment system further includes a frame having a plurality of support members. Adjacent support members of the frame retain the elongated member within the predetermined configuration. In one embodiment, the frame is comprised of at least one of a rigid and semi-rigid material.

In one aspect of the invention, the influent liquid treatment system includes a plurality of treatment modules disposed within the bladder, and an interconnectivity feature coupling the distribution pipe of the modules for distributing the influent liquid to one or more of the modules. In one embodiment, the plurality of modules is arranged in one of a side-by-side arrangement and a vertically stacked arrangement.

In one embodiment, the described arrangements of the filter field are contained within a sealed container or the bladder. The bladder is sealed to the bottom and sides, and can be sealed across the top. At least one advantage of the bladder is to minimize liquid loss and to control the storage volume and location of the influent liquid treated therein.

BRIEF DESCRIPTION OF THE DRAWINGS

The features and advantages of the present invention will be better understood when the Detailed Description of the Preferred Embodiments given below is considered in conjunction with the figures provided.

FIG. 2 is a partial, cross-sectional view of an elongated member of the modular influent liquid treatment system of FIG. 1 taken along line 2-2;

FIG. 3A is a partial, cross-sectional view of the modular influent liquid treatment system of FIG. 1 taken along line 3-3;

FIG. 3B is an enlarged detail view of an outlet of a distribution pipe directing influent liquid into an elongated member in accordance with one embodiment of the present invention;

In these figures like structures are assigned like reference numerals, but may not be referenced in the description of all figures.

DETAILED DESCRIPTION OF THE PREFERRED EMBODIMENTS

The present invention is directed to a modular, portable, self-contained and fully assembled influent liquid treatment system for use in an improved filter field arrangement. The system includes integrated interconnecting features at multiple locations to allow interchangeability and portability of modules as well as adaptation to requirements of various individual structural and site requirements as well as goals of influent liquid treatment as described herein.

Figure 1:
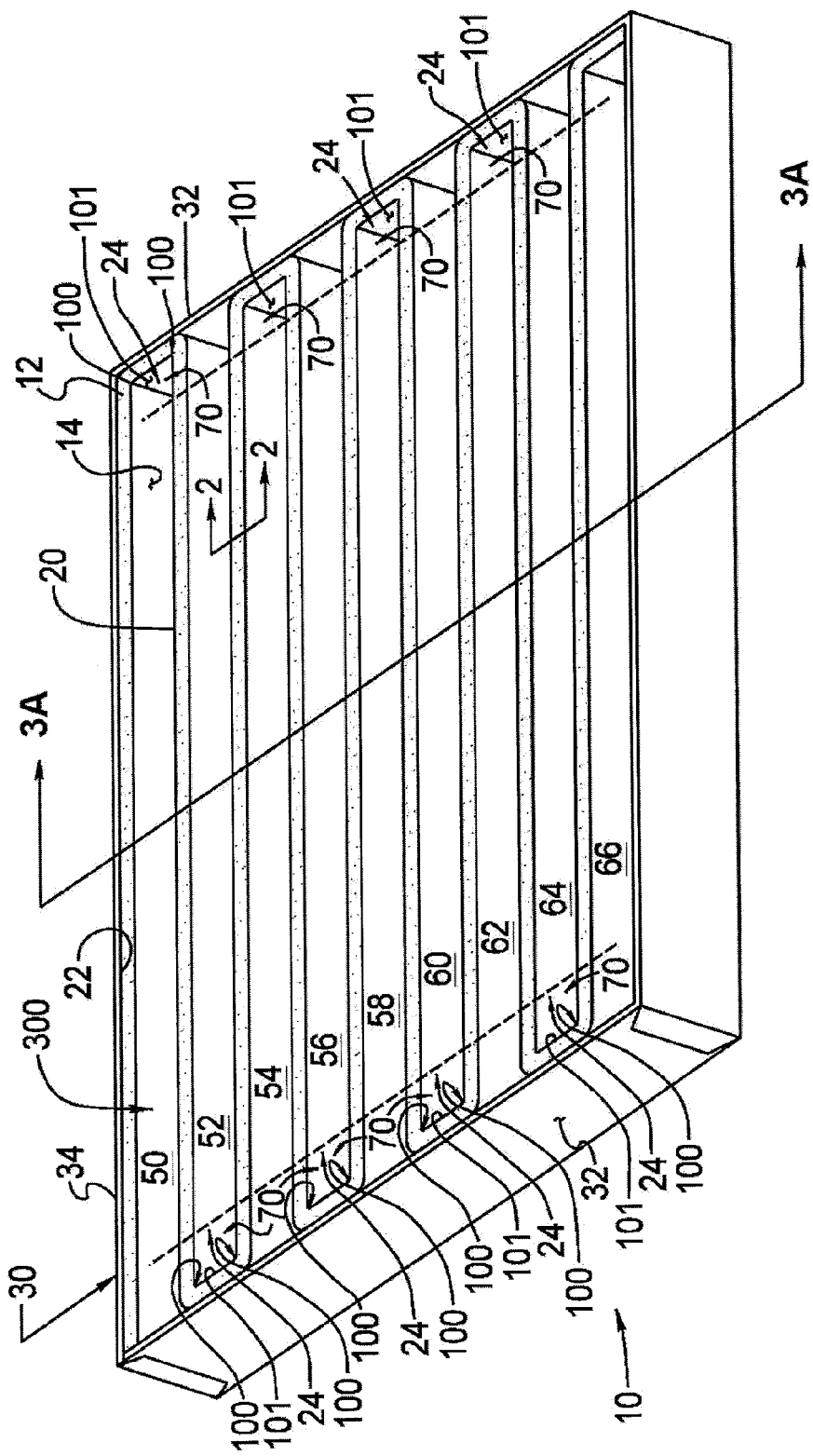
FIG. 1 is a perspective view of a modular, portable influent liquid treatment system in accordance with one embodiment of the present invention.
Figure 4:
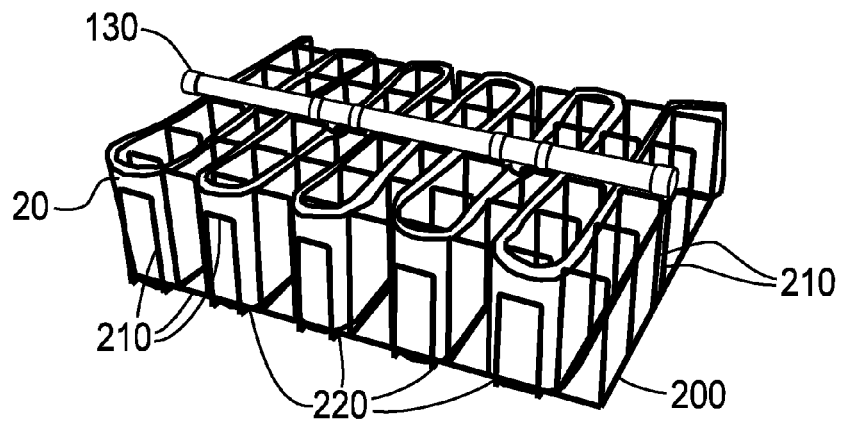
FIGS. 4 and 5 are perspective views of a modular influent liquid treatment system in accordance with one embodiment of the present invention.
Figure 8:
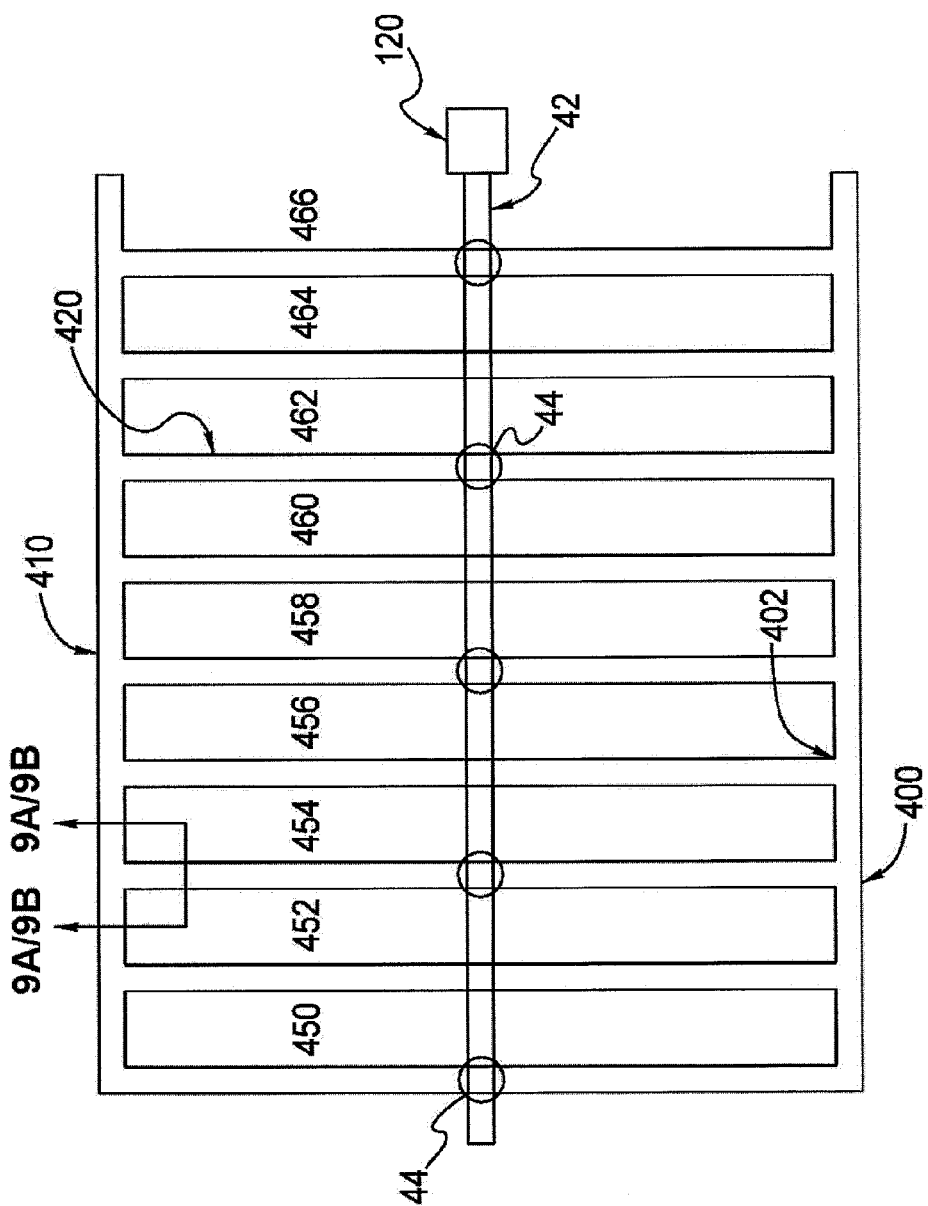
FIG. 8 is a top plan view of an elongated member of a modular influent liquid treatment system in accordance with one embodiment of the present invention.
Figure 9A:
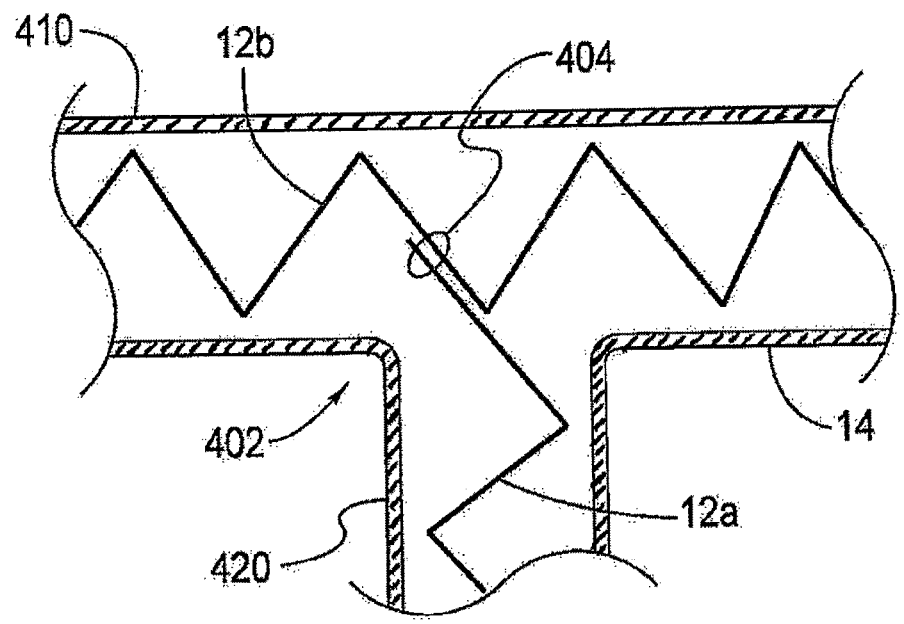
FIGS. 9A and 9B are partial, cross-sectional views of the elongated member of the modular influent liquid treatment system of FIG. 8 taken along line 9-9.
Figure 9B:
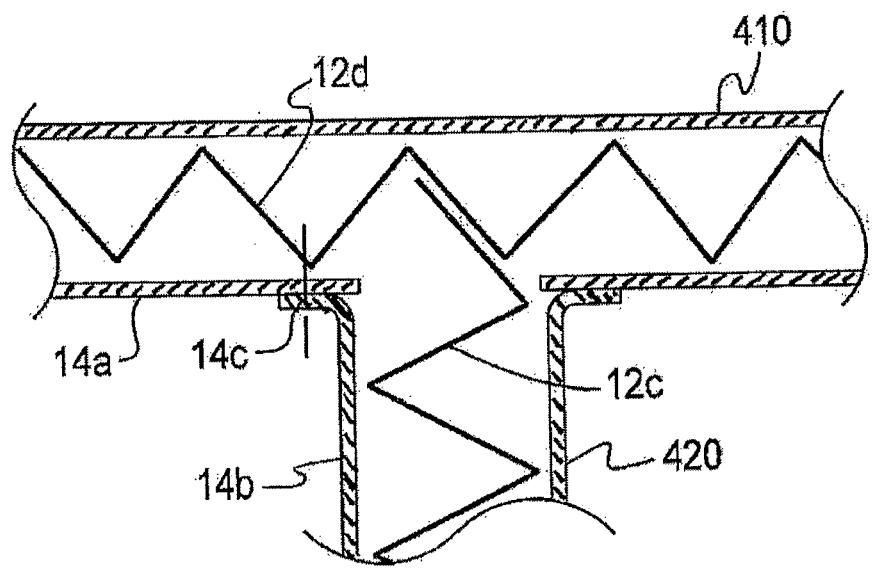

In one embodiment, illustrated in FIG. 1, the influent liquid treatment system is comprised of a modular, self-contained and fully assembled system, shown generally at 10. The influent liquid treatment system 10 treats influent liquids, which may contain for example, solid and liquid waste from a residence, business, park or recreational area, school, church, military base, or like environment where treatment of solid and/or liquid waste is needed, as well as non-potable water from other sources such as, for example, natural sources including rivers, streams, ponds, pools, rain water and other water sources. As shown in FIGS. 1, 4 and 8, the influent liquid treatment system 10 includes a core structure 12 wrapped in a fabric 14 and arranged in an Euclidean geometric form such as, for example, an elongated, serpentine-shaped form 300 (FIGS. 1 and 4), ladder-shaped form 400 (FIG. 8), or other geometric forms such as a U-shaped form, a multiple U-shaped plane form and combinations of the above-described geometric forms. In one embodiment, the fabric wrapped core structure is configured in accordance with the mathematics of fractal geometry. In one embodiment, the core structure 12 is wrapped in the fabric 14 such that a lower surface 13 of the core structure 12 (FIG. 2) is open and exposed to treatment media (described below).

Figure 10:
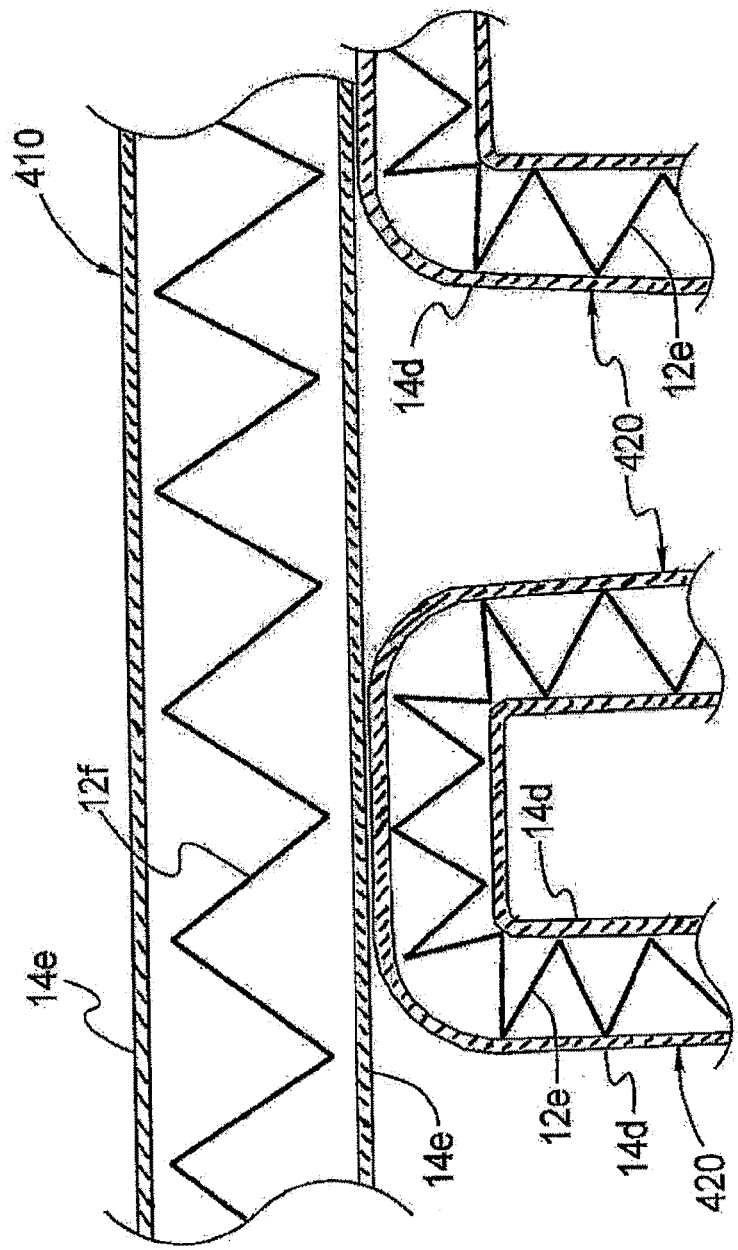
FIGS. 10 and 11 are partial, cross-sectional plan views of elongated members of other embodiments of the modular influent liquid treatment system in accordance with of the present invention.
Figure 11:
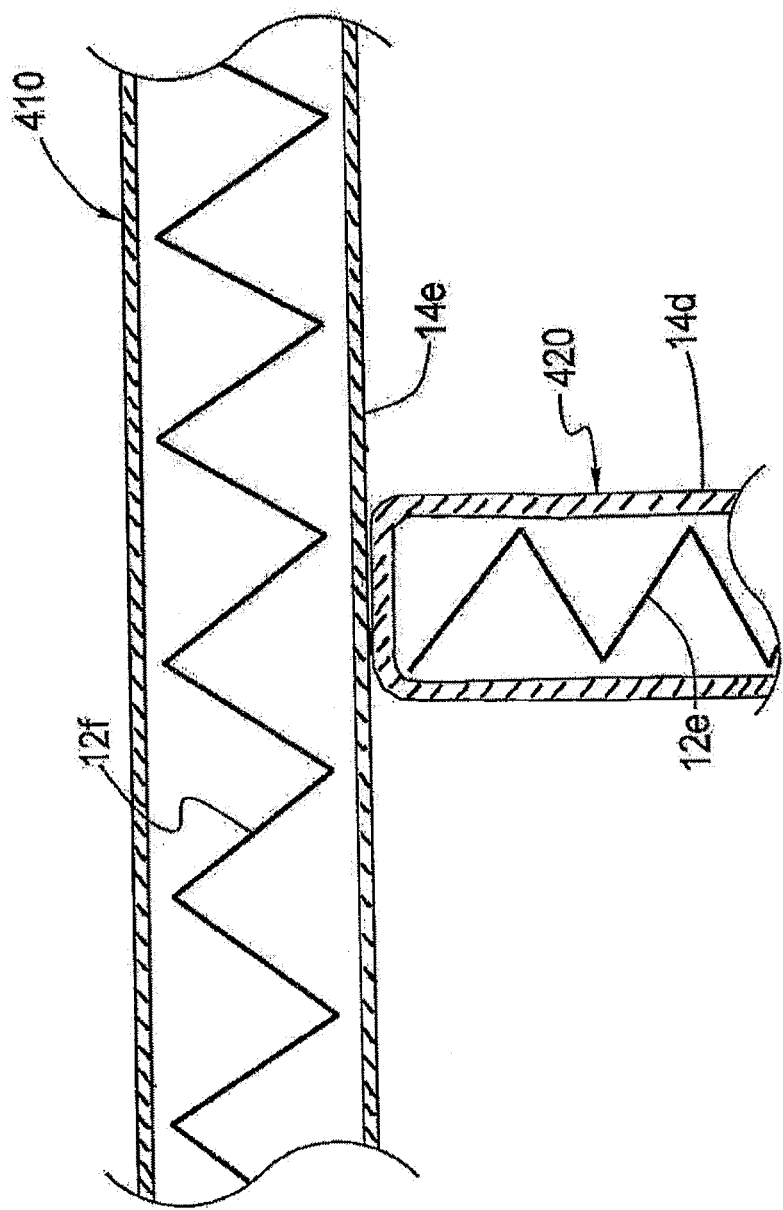

As described herein, the ladder-shape form 400 includes a geometric shape having at least two parallel influent liquid distribution legs 410 and a plurality of influent liquid distribution rungs 420 arranged between and affixed directly to or directly abutting the parallel legs 410 in a generally perpendicular pattern as shown in FIGS. 8-11. In one embodiment, core structures of one or more rungs 420 are coupled to core structures of one or more of the legs 410. For example, as illustrated in FIG. 9A, a core structure 12a of one of the rungs 420 is coupled to a core structure 12b of one of the legs 410 by, for example, a flexible connection 404. As also shown in FIG. 9A, the fabric 14 wrapping the core structures is continuous on an outer surface of the core structures 12a and 12b. For example, in one embodiment, the fabric 14 is draped over the core structures 12a and 12b as in a glove-like manner. In one embodiment, the glove-like wrapped fabric 14 is open exposing one or more surfaces of the core structures 12a and 12b (e.g., corresponding ones of the lower surfaces 13 of the core structures 12a and 12b). In another embodiment, illustrated in FIG. 9B, a core structure 12c of one of the rungs 420 abuts a core structure 12d of one of the legs 410. As also shown in FIG. 9B, the fabric 14 includes a fabric portion 14a wrapping the core structure 12d and a fabric portion 14b wrapping the core structure 12c. In one embodiment the fabric portions 14a and 14b are coupled, joined or bonded such as, for example, by gluing, sewing, fastening with pins, stapling and like mechanical fasteners, ultrasonic welding, and like methods and means for securing and sealing the portions 14a and 14b about adjacent surfaces such as is illustrated generally at 14c. In other embodiments, illustrated in FIGS. 10 and 11, a core structure 12e of one of the rungs 420 abuts a core structure 12f of one of the legs 410. As also shown in FIGS. 10 and 11, the fabric 14 includes a fabric portion 14d individually wrapping the core structure 12e and a fabric portion 14e individually wrapping the core structure 12f.

Referring again to FIG. 1, in one embodiment, the core structure 12 is comprised of a pliable plastic membrane fabricated from, for example, polystyrene, polyethylene or a similar polymer. In one embodiment, the core structure 12 is comprised of an open or semi-open area surrounded by, for example, a permeable or semi-permeable plate or rib, such as a metallic or plastic plate or rib, that holds the fabric 14 wrapped about exterior surfaces of the core structure 12 apart. It should be appreciated that the permeable or semi-permeable plate or rib embodiment forms an essentially open cored elongated member (as is described below) wrapped in the fabric 14.

In one embodiment, the membrane of the core structure 12 includes opposing protrusions extending outwardly from the core structure 12 so as to maintain a separation between a body of the core structure 12 and the fabric 14 surrounding the core structure 12. In one embodiment, the membrane of the core structure 12 possesses characteristics (e.g., is semi-rigid and flexible) such that the core structure 12 can adapt configurations including the aforementioned serpentine form 300 and ladder form 400 having about ninety-degree (90°) angles, shown in FIG. 1 generally at 100 and FIGS. 8 and 9A generally at 402, and abutting or coupled members. In one embodiment, the fabric 14 is comprised of a non-woven fabric such as geotextile fabrics as are commercially available under brand names TYPAR 3401 and 140EX from Thrace-Linq, Inc. (Summerville, S.C., USA) which possess qualities including, for example, effective open pore spaces that allow minimal restriction to passage of the influent liquid, e.g., water and effluent liquid there through, and are durable to withstand indeterminate lengths of time buried within soil and/or are in a continuously saturated condition. In accordance with the present invention, the core structure 12 and non-woven fabric 14 do not degrade or decompose when subjected to long-term immersion in the influent liquid including, for example, non-potable water and sewage, or when buried within soils.

FIG. 2 is a cross-sectional view of the core structure 12 and wrapped fabric 14 taken along line 2-2 of FIG. 1. In one embodiment, the core structure 12 and the wrapped fabric 14 form an elongated member 20 that is about, but not limited to, six inches (6 in./15.2 cm.) in height by about one inch (1 in./2.5 cm.) thick. In other embodiments, the elongated member 20 is about, for example, one of seven inches (7 in./17.8 cm.), twelve inches (12 in./30.5 cm.), thirteen inches (13 in./33.0 cm.), and twenty-six inches (26 in./66.0 cm.) in height. In one embodiment, the elongated member 20 is arranged in the serpentine form 300 (FIG. 1) or ladder form 400 (FIG. 8) and disposed in a support structure or box 30 such as, for example, a five-sided corrugated cardboard box having a length L and a width W. In one embodiment, illustrated in FIG. 1, a first side 32 of the box 30, corresponding to width W, is about, for example, forty-eight inches (48 in./121.9 cm.) in length, and a second side 34 of the box 30, corresponding to length L, is about, for example, sixty-eight inches (68 in./172.7 cm.) in length. Thus, the serpentine form 300 of the elongated member 20 is retained within about forty-eight inches (48 in./121.9 cm.) in width and about sixty-eight inches (68 in./172.7 cm.) in length. As shown in FIG. 1, a first side 22 of serpentine form 300 of the elongated member 20 is parallel to the second side 34 of the cardboard box 30 while bends, shown generally at 24, in the serpentine form 300 of the elongated member 20 are parallel to the first side 32 of the box 30. In one embodiment, the elongated member 20 is held in place within the box 30 with a biodegradable adhesive 40. In another embodiment, the elongated member 20 is held in place with a friction fit between tabs or protrusions (not shown) projecting from the walls of the box 30. As should be appreciated, the protrusions, adhesive 40 and the box 30 are structural components of the system 10 which allow ease of manufacture, shipping, and installation, and which combine to contribute, for example, to modular and portable aspects of the present invention.

Figure 5:
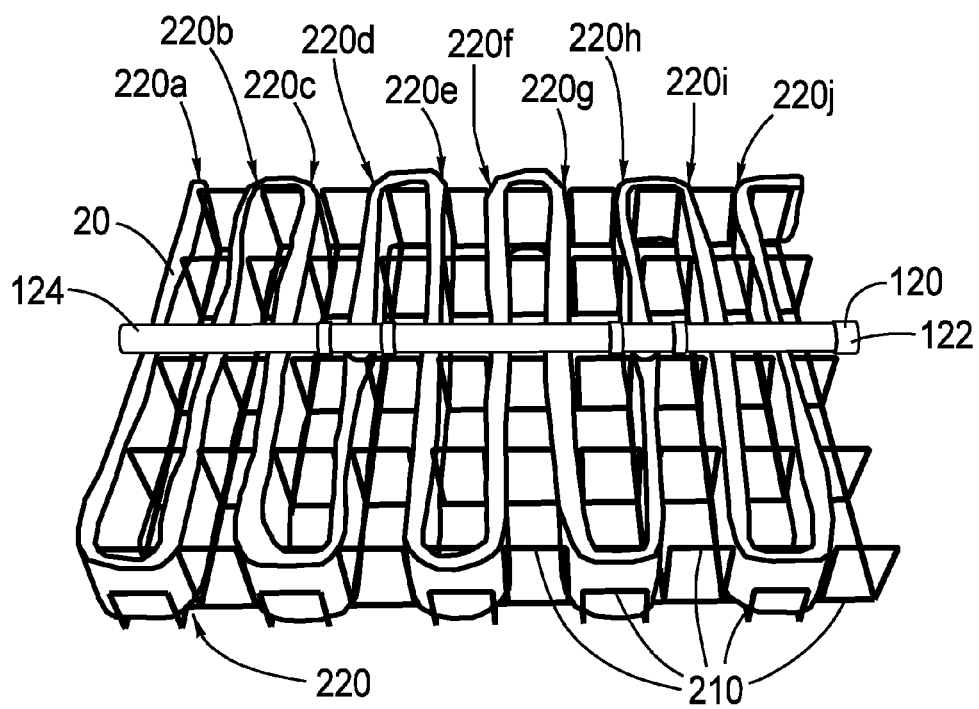
Figure 6:
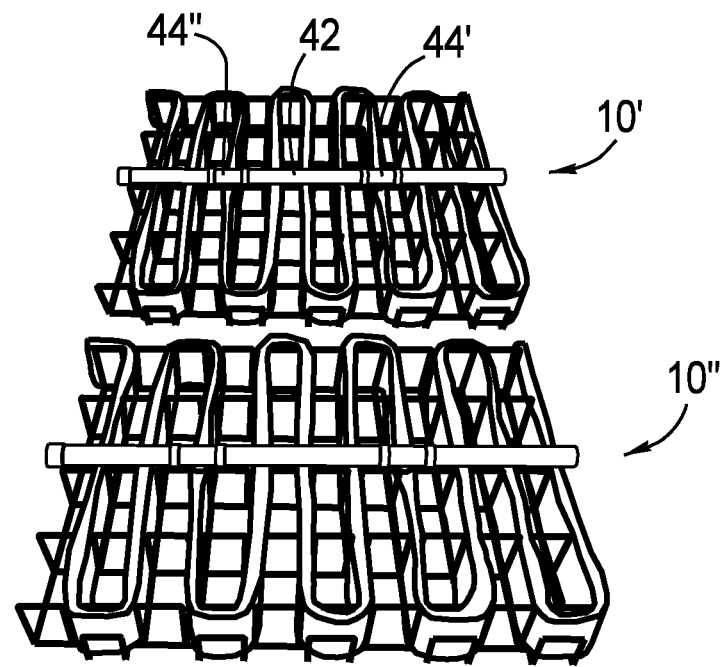
FIG. 6 is a perspective view of a pair of modular influent liquid treatment system arranged in a side-by-side arrangement providing an increased effective filter area and storage capacity in accordance with one embodiment of the present invention.
Figure 7:
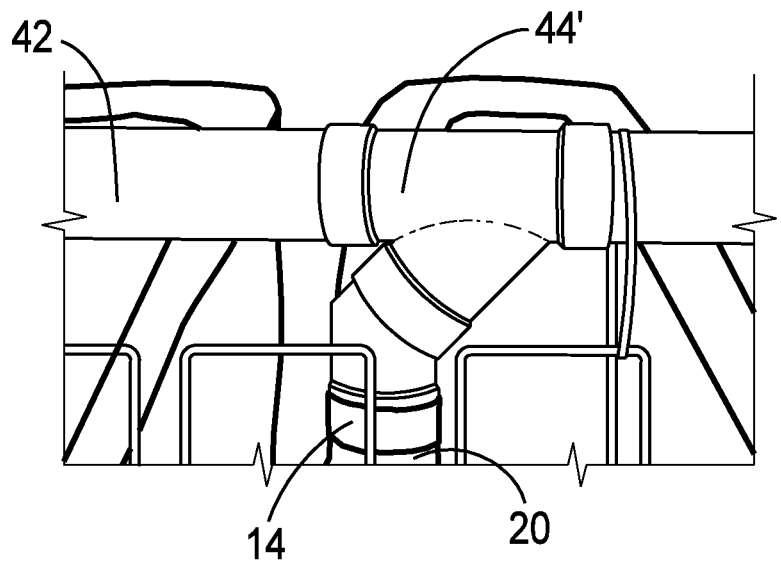
FIG. 7 illustrates an outlet for directing influent liquid into the elongated member of the modular influent liquid treatment system in accordance with one embodiment of the present invention.

In one embodiment, illustrated in FIGS. 4 and 5, the elongated member 20 is arranged in the serpentine form 300 and disposed in a support structure including a rigid or semi-rigid frame 200. It should be appreciated that the ladder-shaped form 400 may similarly be disposed in the frame 200. In one embodiment, the rigid or semi-rigid frame 200 is comprised of, for example, ferrous or non-ferrous wire, plastic, cellulose, timber, plant-derived man-made fibrous substance, or like petroleum or hydrocarbon based materials. In one embodiment, the rigid or semi-rigid frame 200 is comprised, at least in part, of a conductive material such that by applying an electrical current, depicted by arrow e, from an external source 540 to the frame 200 (FIG. 12), treatment of the influent liquid is enhanced. The inventors have recognized that an applied electric field provides beneficial treatment effects and improves potability of the influent liquid. For example, the applied electrical field is seen to reduce nitrogen, bacteria and other contaminants within the influent liquid under treatment as such contaminants bond with the electrified frame 200 rather than passing in the treated influent liquid. In one embodiment, illustrated in FIGS. 12, 14 and 14A, the rigid or semi-rigid frame 200 includes tubular members 202 having an internal conduit 204 and openings 205 in a side wall 203 of the members 202 for conveying, for example, treatment products such as gas (e.g., air) or a liquid, depicted by double arrow 206 from an external source 560 to provide and/or augment heating, cooling, dilution, and/or chemicals for promoting conductivity such as electrical conductivity of the members 202 and thus the frame 200, as well as improving the break down of contaminants in the influent liquid under treatment. In one embodiment, the tubular members 202, internal conduit 204 and openings 205 cooperate with the external source 560 (e.g., a pump) to provide a means of recovery (e.g., extraction) of the added products (e.g., the gas, chemicals, and the like) and/or the influent liquid (or portion thereof) under treatment. In one embodiment, the partially treated and the treated influent liquid is recovered and reintroduced at headworks of treatment (e.g., the starting point/location or mixing/holding tank) or at an intermediate location within the treatment system 1300, for example, sent up or downstream within the waste stream, sent to a storage vessel, or for direct use. In one embodiment, the liquid 206 includes clean water (or other liquid) added via the tubular members 202 to, for example, dilute the influent liquid under treatment. In one embodiment illustrated in FIG. 12, electrically conductive elements 208 may be added (e.g., affixed) to the frame 200 to provide or augment the applied electric field. It should be appreciated that the applied electric field may vary depending on treatment characteristics, for example, may be dependent upon a relative "strength" (e.g., concentration) or load of contaminants in the stream of influent liquid.

As shown in FIGS. 4 and 5, the frame 200 includes a plurality of support members 210 that cooperate to retain the elongated member 20 within a predetermined configuration, e.g., the serpentine-shaped form 300, the ladder-shaped form 400 or other forms. In one embodiment, adjacent support members 210 define a plurality of channels 220 such as, for example, channels 220a-220j. As such, the adjacent ones of the plurality of support members 210 cooperate such that the elongated member 20 is retained within the channels 220 by, for example, a friction fit with corresponding support members 210. In one embodiment, a plurality of ties or fasteners (not shown) may couple the elongated member 20 to the frame 200. In one embodiment, illustrated in FIGS. 3-8, an influent liquid distribution conduit or pipe 42 is coupled to a portion of the frame members 200 (e.g., a top portion) and is directly connected to the elongated member 20 for uniformly and consistently introducing influent liquid to the elongated member 20 and then to the treatment medium.

Figure 12:
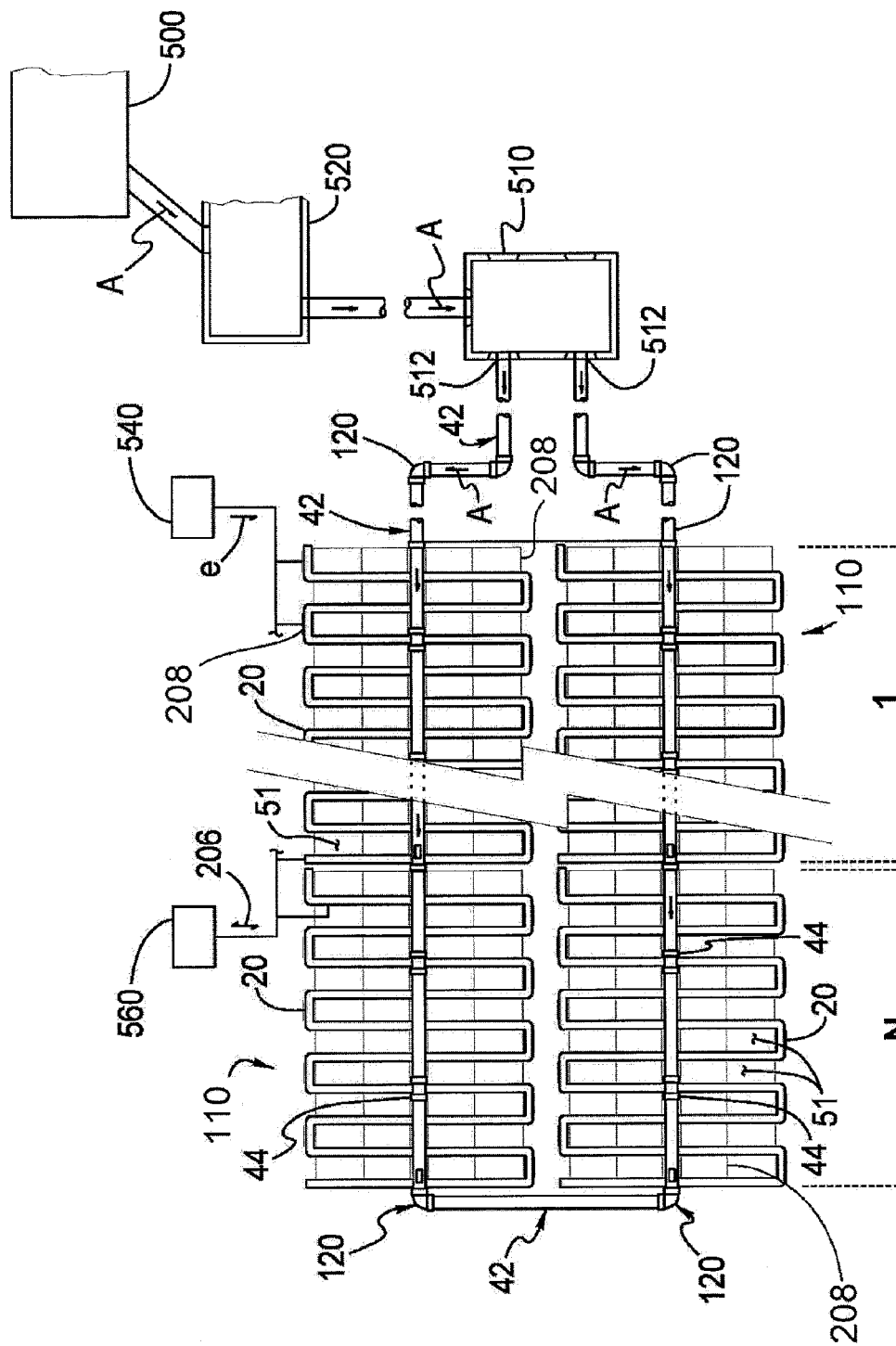
FIG. 12 is a schematic plan view of modular influent liquid treatment systems of the present invention coupled in a series arrangement to service a structure of interest.

Each of the influent liquid distribution pipes 42 includes an interconnectivity feature 120. In one embodiment, the interconnectivity feature 120 is one of a male or a female coupling, fitting or adapter for joining sections of pipe. As shown in FIG. 5, a first end of the distribution pipe 42 includes a female coupling 122 and a second end of the pipe 42 includes a male coupling 124 or, simply, an unobstructed end of the pipe 42. As shown in FIG. 12, a plurality of interconnectivity features 120 couple the distribution pipes 42 of a plurality of modules 110 in a series arrangement of, for example, two rows and N columns, for example Column 1 to Column N. The plurality of modules 110 are coupled to discharge outlets or ports 512 of a wastewater treatment vessel such as, for example, a distribution tank 510 and/or a septic tank 520, or a non-potable liquid supply, for directing a flow of influent liquid (depicted by arrows A) to the elongated members 20 of the modules 110 and approved filter field medium 51 disposed between portions of the members 20 (described below) for treatment. As can be appreciated, the interconnectivity features 120 couple the distribution pipes 42 of an arrangement of two or more modules 110 within a filter field. For example, the above described arrangement of rows and columns of modules 110 that may vary to suit the treatment requirements of influent source or the structure of interest 500. The distribution pipes 42 direct the flow of influent liquid from the structure 500 to the two or more modules 110. In one embodiment, a last module 110 coupled in an arrangement of modules 110 (e.g., at an end of a row) is terminated with a capping device 130 (FIG. 4) such as, for example, a plug or cap end. In another embodiment, the distribution pipes 42 of the two or more modules 110 are coupled together to form a closed loop arrangement (FIG. 12). As shown in FIG. 12, the interconnectivity feature 120 allows connection of a series of modules 110 of seemingly any desired length to meet the requirements of a particular filter field design.

In one embodiment, a filter field is prepared by excavating soil in a predetermined area surrounding a structure (e.g., residential, commercial, recreational, military, or the like) serviced by the influent liquid treatment system. In one embodiment, the influent liquid treatment system is placed on the ground or elevated platform (e.g., a shipping pallet or the like) such that the filter field is not within excavated soil. In one embodiment, modules of an influent liquid treatment system are stacked and have support members securing, for example, the bottom and sides of the stacked arrangement. As described below, the modules of the filter field are enclosed within a bladder or containment vessel to prevent evaporative loss and to improve, for example, portability of the system. In one embodiment, the system is disposable after expiration of a predetermined life cycle of the treatment system. Components of the influent liquid treatment system are then installed into the area of the previously prepared soil or, on the ground or platform. In one embodiment, the prepared soil or area of the above ground installation, may be supplemented by introducing a leveling and smoothing layer of a highly permeable material such as, for example, sand. In accordance with the present invention, the box 30 or the frame 200 that contains the elongated member 20 arranged in the serpentine form 300 or ladder-shaped form 400 along with a supplied integral influent liquid distribution pipes 42, is disposed in the excavated area and on the prepared soil. As noted above, the adhesive 40 and the box 30, or support member 210 and channels 220, cooperate to provide structural support to the elongated member 20 such that installation is not labor intensive. For example, one or two persons may dispose the box 30 or frame 200 containing the elongated member 20 and the pipes 42 in the excavated area or platform, with relative ease. Once disposed little, if any, subsequent alignment of the elongated member 20 is needed. Rather, once the distribution pipes 42 are coupled to the supply of influent liquid, the modules 110 are operational. As noted below, in one embodiment, treatment medium is placed about open areas defined by the elongated member 20.

This efficient manner of installation is a marked improvement over conventional installation procedures. For example, the inventors have discovered that ease of installation is afforded the inventive influent liquid treatment system 10 by its novel, intact structural integrity provided by the adhesive 40 or channels 220, the serpentine form 300 or ladder-shaped form 400 wrapped in fabric 14, the support structure (e.g., the box 30 or frame 200) and the incorporated distribution pipes 42. The efficient installation procedures also extend to multiple modules installation. For example, after a first one 10' of the inventive influent liquid treatment system 10 is laid into an open excavation (as described above), a second one 10" of the inventive influent liquid treatment system 10 may be placed along side the first system 10' as is shown in, for example, FIG. 6. The two respective distribution pipes 42 are couplable, e.g., are inter-connectable via mating connectivity features 120, to uniformly distribute influent liquid between the systems 10' and 10". Suitable sealing means, as are generally known in the art, may be employed at the junctures of the two or more influent liquid treatment systems 10. The process of coupling influent liquid treatment systems 10 may be repeated without restriction until a desired length and/or width of an influent liquid treatment system filter field is achieved such as is illustrated in FIG. 12.

It should be appreciated that while the distribution pipes 42 are described as uniformly distributing influent liquid between the systems 10' and 10", it is within the scope of the present invention for a source of influent liquid to be introduced at one end of the systems 10' and 10" and pass via progressive horizontal flow. Moreover, the horizontal flow may be augmented with vertical flow between stacked modules, and/or for one or more collection, extraction, re-insertion and feedback loops or conduits such that one or more passes of influent liquid is directed through the systems 10' and 10".

In one embodiment such as, for example, in a below ground installation with the support structure (e.g., the box 30 or frame 200) and the elongated member 20 in place, open areas 50, 52, 54, 56, 58, 60, 62, 64, 66 between runs of the elongated, serpentine form 300 of member 20 (and corresponding areas between adjacent channels 220 of the frame 200) are filled with approved filter field medium 51 such as, for example, washed sand of particular gradation, activated charcoal, silica or other organic or non-organic material. Similarly, open areas 450, 452, 454, 456, 458, 460, 462, 464, and 466 between runs of the elongated, ladder-shaped form 400 of member 20 are filled with the approved filter field medium 51. In one embodiment, the open areas 50, 52, 54, 56, 58, 60, 62, 64, 66 (as are open areas 450, 452, 454, 456, 458, 460, 462, 464, and 466) are between about two inches (2 in./5.1 cm.) and about six inches (6 in./15.2 cm.) in width over substantially all their length. In one embodiment, the filter field medium 51 is also disposed at a depth of about two inches (2 in./5.1 cm.) to about six inches (6 in./15.2 cm.) directly beneath the support structure (e.g., the cardboard box 30 or frame 220) in addition to an area of about two inches (2 in./5.1 cm.) to about six inches (6 in./15.2 cm.) immediately surrounding the cardboard box 30 on each of its sides 32 and 34, or around a perimeter of the frame 200. In another embodiment such as, for example, in an above ground installation, filter field medium 51 may or may not be disposed within the open areas between, below and around the box 30 and frame 200.

With the support structure (e.g., the box 30 or frame 200), the elongated member 20, and with and without the medium 51 in place, influent liquid is supplied to the elongated member 20 by the pipes 42 that run across a surface (e.g., a top surface) of the serpentine/ladder-shape configuration, as is illustrated in FIGS. 3A, 6, 7, 8, 12 and 13. FIG. 3A is a cross-sectional view taken along line 3-3 of FIG. 1. As shown in FIG. 3A, the pipes 42 include at least one outlet 44 for directing influent liquid 80 down into the elongated member 20. In another embodiment, illustrated in FIGS. 6 and 7, the pipe 42 include at least two outlets 44' and 44" for directing the influent liquid 80 down into the elongated member 20. In yet another embodiment, the influent liquid 80 is directed down into the at least one of the legs 410 and the rungs 420.

For example, as illustrated in FIG. 8, the influent liquid 80 is directed by a plurality of outlets 44 down into a plurality of the rungs 420. As is generally known, influent liquid is supplied by gravity flow, pressurized flow, or combinations thereof. In one embodiment illustrated in FIG. 3B, the outlet 44 includes one or more fittings 92 (e.g., "T" or "Y" shaped fitting and/or an "elbow" fitting or the like) and a section of pipe 94 coupled to and extending from the fitting 92. In one embodiment, the pipe 94 includes a slot 96 configured to receive a width of the elongated member 20 therein. In one embodiment, illustrated in FIGS. 3A, 3B and 7, the elongated member 20 includes a portion having a break or cut in the fabric 14 such that the core structure 12 is received in the slot 96 and the fabric 14 covers an outer surface of the pipe 94. In one embodiment, a shroud 98 is disposed about the outlet 44 such that the shroud 98 covers an area of engagement of the core structure 12 and the slot 96. For example, the shroud 98 may include a central bore that accepts the pipe 94 and a portion of the fitting 92 to allow the shroud 98 to enclose the fitting 92 and the core structure 12. In one embodiment, the shroud 98 is comprised of the aforementioned geotextile fabric. In one embodiment, the shroud 98 is coupled, joined or bonded such as, for example, by gluing, sewing, fastening with pins, stapling and the like, ultrasonic welding, and like methods and means for securing, to the fabric 14. In one embodiment, the shroud 98 is secured about the fitting 92 by, for example, a tie or clamp (not shown).

As noted above and shown in FIGS. 6 and 12, it should be appreciated that one or more of the modular influent liquid treatment systems 10 can be disposed within an excavated area or above ground to achieve a filter field of desired characteristics to service outflow from a structure of interest (e.g., a residential, commercial, recreational, school, church, military or like structure) or filter a source liquid to provide an output of potable water. For example, two or more modular influent liquid treatment systems 10' and 10" (e.g., boxes 30 or frames 200 each including an elongated member 20, with or without approved filter field medium disposed therein), can be disposed side-by-side to form rows in the filter field. Similarly, two or more modular influent liquid treatment systems 10 may be coupled in linear series to provide a desired length for each of the one or more rows and columns within the filter field. In one embodiment, the rows are, for example, about sixty-eight inches (68 in./172.7 cm.) wide and are, for example, of a length that is a multiple of about forty-eight inches (48 in./121.9 cm.). A maximum length of a row is dictated by local regulatory restrictions of city or town building and/or health departments and/or agencies, or by engineering Best Management Practices, as are generally known in the art. As such, each row and/or column may include two or more modular treatment systems 10 as is required to meet particular influent liquid treatment needs. It should be appreciated that while the modular treatment system 10 is described above as being of particular height, length and width, it is within the scope of the present invention to vary these dimensions as needed to address a variety of influent liquid treatment requirements. It can be further appreciated that the above described system may have a height dimension of between, for example, about one inches (1 in./2.5 cm.) and about one hundred twenty inches (120 in./304.8 cm.) individually or in a stacked arrangement, and can be used when the treatment system is disposed in or on the earth in a longitudinal linear fashion. When the above described treatment system is installed in a predominantly vertical tower-like (e.g., stacked) configuration the height of the invention may have unlimited proportions.

With respect to filter field characteristics, in accordance with the present invention, biological treatment of influent liquid occurs within an area of approved filter field treatment medium 51 that is disposed adjacent to and below the elongated member 20. That is, the medium 51 may be disposed above, within and below the open areas 50, 52, 54, 56, 58, 60, 62, 64, 66 between runs of the elongated, serpentine form 300 of member 20 (FIG. 1), the open areas 450, 452, 454, 456, 458, 460, 462, 464, and 466 of the ladder-shaped form 400 of the elongated member 20 (FIG. 8), as well as corresponding areas between the channels 220 of the frame 200 and, in particular, adjacent to vertical 20a and bottom 20b fabric covered surfaces of the elongated member 20 (FIG. 2), as well as the areas surrounding and under the box 30 and/or frame 200. It should be appreciated, however, that an internal area 70 proximate to each of the bends 24 and 402 in the serpentine/ladder-shaped forms of the elongated member 20 will not provide treatment to influent liquid discharged from each of surfaces 101 to the same degree as from the open areas 50, 52, 54, 56, 58, 60, 62, 64, 66 of the elongated, serpentine form 300, open areas 450, 452, 454, 456, 458, 460, 462, 464, and 466 of the ladder-shaped form 400, and between runs of the elongated member 20 (e.g., vertical 20a and bottom 20b fabric covered surfaces of the elongated member 20) and areas surrounding and under the box 30 and/or frame 200. As such, the surfaces 101 are discounted in a determination of an effective filter area. In one embodiment, the internal area 70 spans about four inches (4 in./10.2 cm.) in length from each of the bends 24. Accordingly, and in accordance with one embodiment of the present invention, a total surface area of the elongated member 20 that provides influent liquid treatment within a filter area is about fifty-seven square feet (57 sq. ft./5.3 sq. m.). As is generally known in the art, influent liquid treatment is a function of the provided filter treatment area.

It should be appreciated that filter fields of greater treatment area and greater storage capacity per linear foot/meter can be achieved by stacking modules, for example, placing a first system 10 including a first module (e.g., the box 30 or the frame 200 and the elongated member 20) in prepared field area (e.g., in or above ground), and placing a second system 10 including a second module above the first module. In such a stacked configuration, influent liquid is supplied to the upper, second module as described above, and pipes interconnecting the first and second modules would hydraulically pass influent liquid to the lower, first module. In another embodiment, the influent liquid flow is divided between the stacked modules to form a treatment train. In one embodiment, the frame 200 includes support members to stabilize the stacked arrangement, as needed, within an above or below ground installation.

In one aspect of the invention, the aforementioned module includes the box 30 or frame 200 and elongated member 20 that is about forty-eight inches (48 in./121.9 cm.) wide by about sixty-eight inches (68 in./172.7 cm.) long is reduced in size. For example, in one embodiment, a similarly functioning module is configured as about thirty inches (30 in./76.2 cm.) long by about forty-eight inches (48 in./121.9 cm.) wide, with the long lengths of the serpentine/ladder-shaped forms parallel to the thirty inch (30 in./76.2 cm.) dimension. The reduced sized influent liquid treatment system module provides an effective filter area of approximately one half of the previously described system for square feet/meter per linear foot/meter of filter field and storage capacity. It should be appreciated that the reduced sized module may also be used side-by-side or stacked in multiple unit arrangements, as discussed above. Additionally, it should be appreciated that the larger and reduced sized modules may be connected in various arrangements within one system as influent liquid treatment requirements for a particular implementation dictate.

As described herein, the inventors have discovered that influent liquid treatment systems 10 including one or more of the modules (e.g., the box 30 or frame 200 and the elongated member 20 disposed therein in a serpentine/ladder-shaped form) provide improved influent liquid treatment. The disclosed system and novel configuration substantially eliminates areas of competing biomat that is a perceived deficiency with conventional arrangements. In other words, the novel arrangements as described herein minimize, if not eliminate, completing biomat areas such that the areas do not interfere with, and thus negate each other. Additionally, the aforementioned arrangements provide for distribution which ensures that areas of unwanted prolonged saturation within the treatment medium does not occur and, as such, provides for uniformly oxygenated biomat development that is seen as an improvement over conventional systems that merely include random disbursement of influent liquid and thus random and poorly oxygenated biomat development. Moreover, superior treatment of influent liquid is achieved by maximizing the density of treatment surfaces within each linear unit of filter field length. In one embodiment, a flow of air (e.g., oxygen) is provided to the modules to further improve oxygenated biomat formation and, thus, improved treatment. For example, the above described tubular members 202 (FIG. 14A) having internal conduits 204 may provide and/or augment delivery of the flow of oxygen (e.g., flow 206) to the treatment area within one or more of the modules.

Yet another perceived improvement over conventional systems results from the use of the frame 200 comprising a metal including ferrous or non-ferrous material such as, for example, wire. In this embodiment, the location of the subsurface (e.g., buried) system 10 can be identified without excavation by use of, for example, a metal or other ferrous material detector. As can be appreciated, the ability to detect the location of the buried system without excavation provides significant advantages in time and cost of repairing and maintaining the system 10. Moreover, when substantially all (or a significant portion of) of the frame 200 is detectable above surface, a more precise view of the installed configuration is apparent without excavation. Additionally, the use of an above surface detector may permit non-invasive inspection of key elements of the system to ensure that installation was performed to specification such as, for example, in the designed location and/or configuration to achieve the desired influent liquid treatment. In one embodiment, the box 30 or frame 200 is comprised of a material that is not detectable by a non-invasive above surface detector, but has incorporated in its construction a feature or features (e.g., retaining clips, fasteners, and the like) that are detectable by the non-invasive above surface detector.

Figure 13:
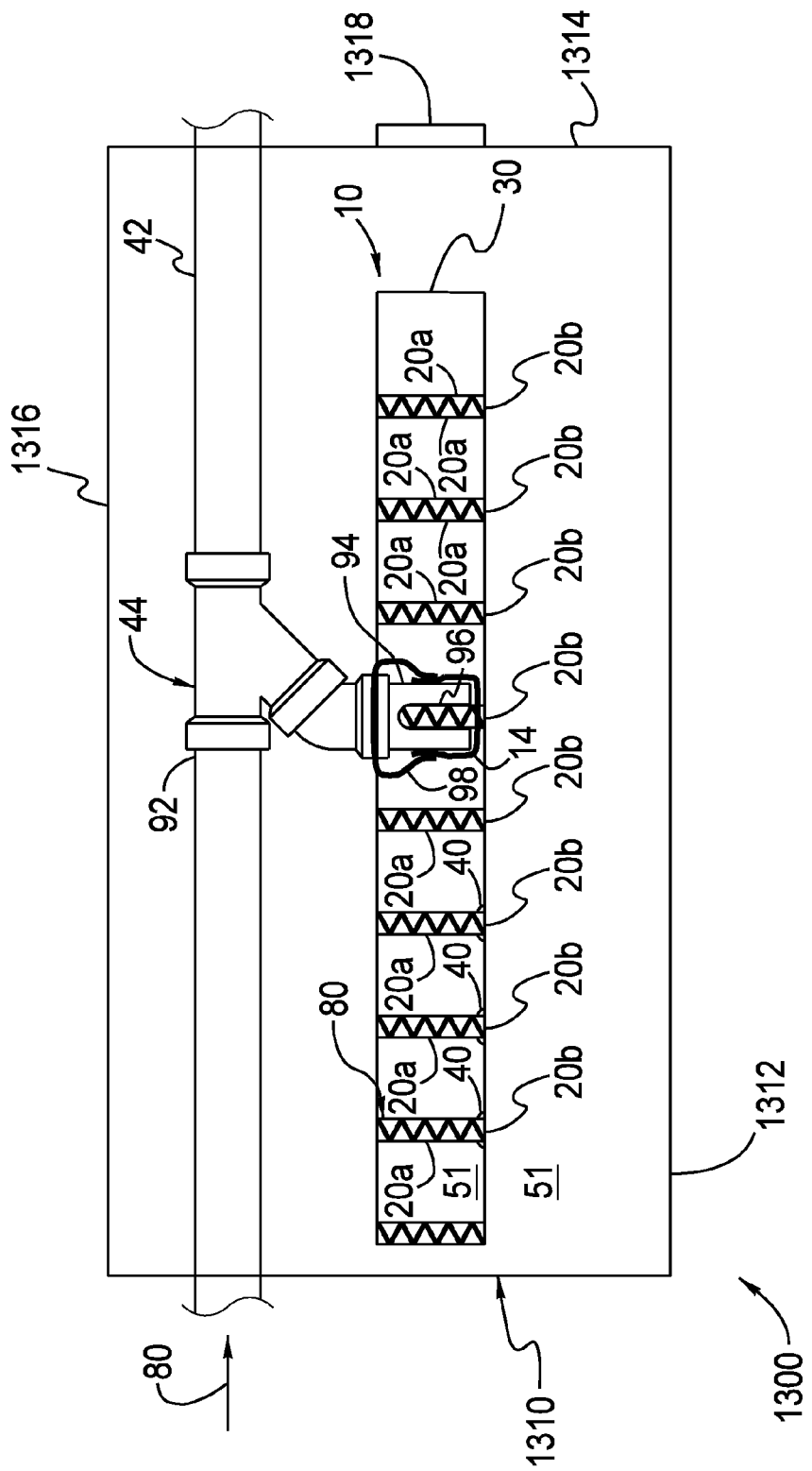
FIG. 13 is a schematic section view of the modular influent liquid treatment system showing the bladder containment to the bottom, sides and top.
Figures 14, 14A:
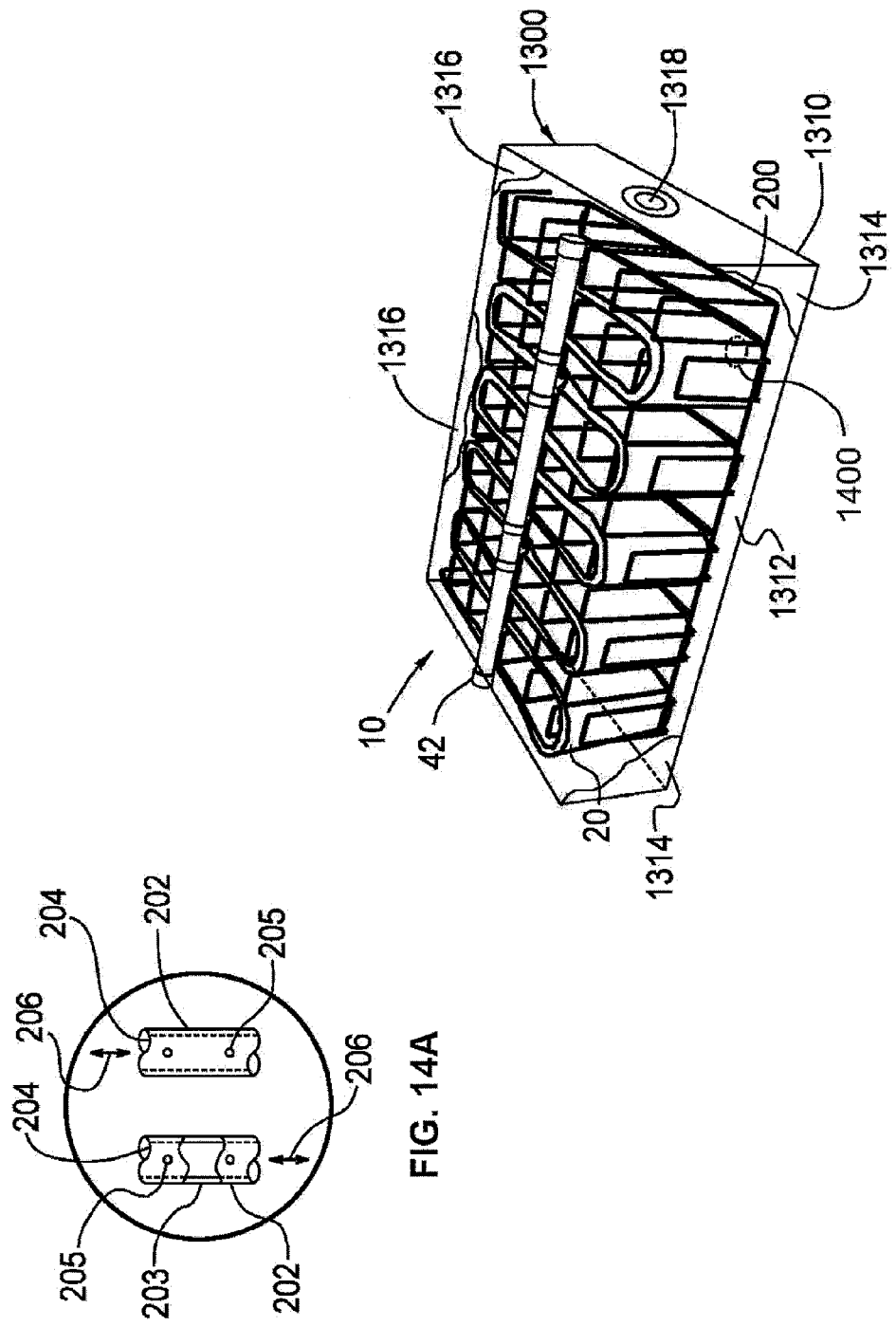
FIG. 14 is a schematic plan view showing the modular influent liquid treatment system with the bladder.
FIG. 14A is a detailed view of a portion of the treatment system of FIG. 14.

FIG. 13 illustrates a schematic, partial cross-sectional view of a modular and portable influent liquid treatment system 1300 including a bladder or other containment vessel, shown generally at 1310. The bladder 1310 includes a bottom 1312, a side wall or walls 1314, a top 1316 and an outlet 1318. In one embodiment, the bladder 1310 is made of a liquid impervious material such as, for example, a plastic liner including a 60-mil high-density polyethylene (HDPE) and the like. The bladder 1310 contains one or more of the influent treatment systems 10, and approved filter field medium 51, as described herein and provides treated influent liquid at the outlet 1318. Also illustrated is the distribution conduit or pipe 42 carrying the influent liquid 80 to the one or more treatment systems 10 within the bladder 1300. Similarly, FIG. 14 illustrates a prospective view of the modular influent liquid treatment system 1300 with the bladder 1310. While not shown, it should be appreciated that influent liquid storage, either or both of into and out of the system 1300, may be achieved using pipes and/or containers coupled to distribution pipe 42 within or outside the bladder 1310. FIG. 14A provides a detailed view of a portion 1400 of the treatment system 10 of FIG. 14. One embodiment of a conveyance system is illustrated in FIG. 15.

Figure 15:
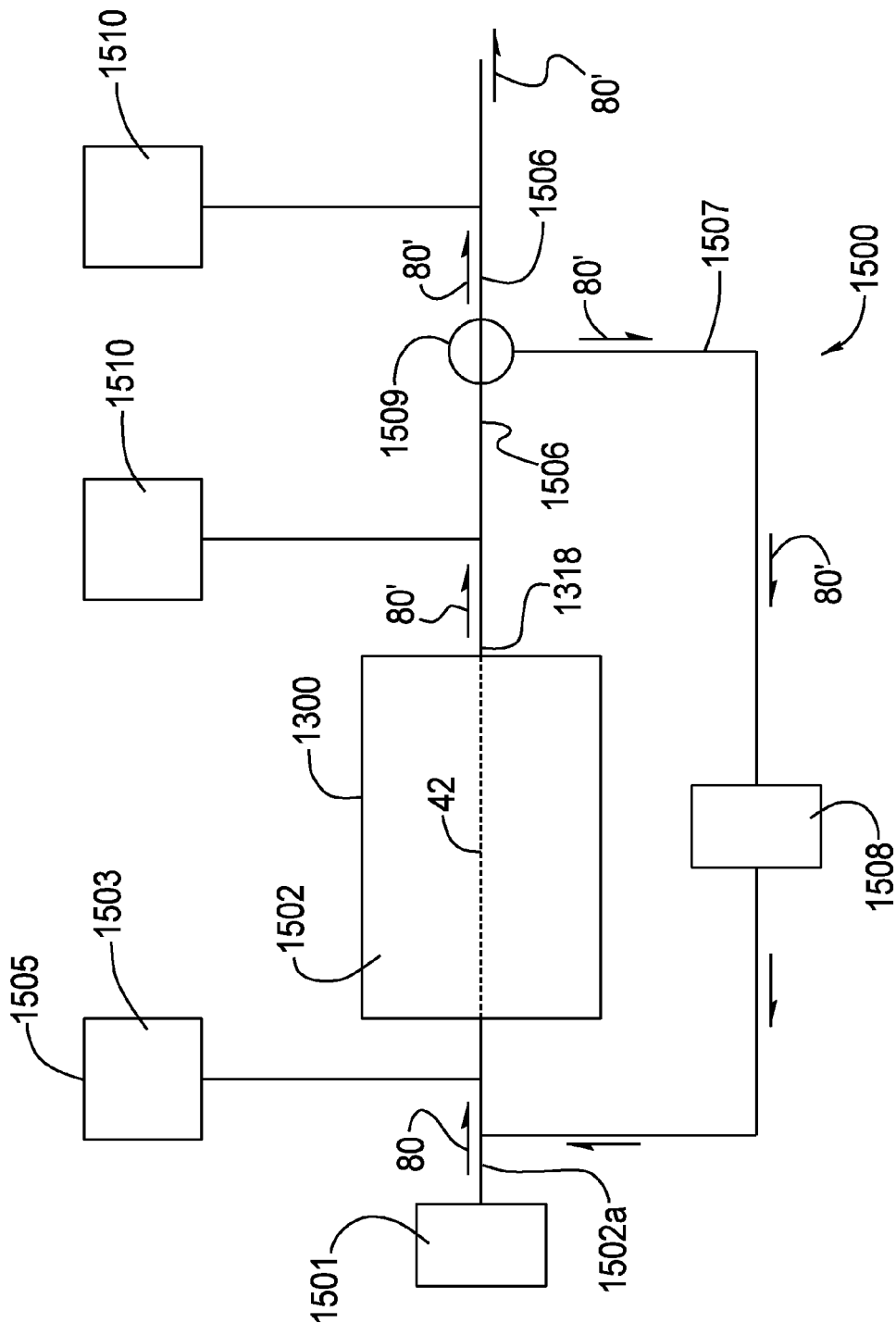
FIG. 15 is a schematic flow chart showing the process of primary treatment using a deposition chamber for large particles, and a conveyance pipe to the filter field through the bladder.

FIG. 15 illustrates a schematic block diagram flow charting a process 1500 of primary treatment of influent liquid 80 using a deposition chamber 1501 for large particles. In one embodiment, the deposition chamber 1501 may include, for example, a septic tank of a wastewater system or a holding tank of an influent liquid treatment system. As shown in FIG. 15, a first conveyance pipe 1502a passes the influent liquid 80 from the deposition chamber 1501 to the filter field 1502 and, in particular, one or more of the influent liquid treatment system 1300 including the bladder 1310 within the filter field 1502. The influent liquid 80 passes through the distribution pipe 42. In one embodiment, the influent liquid 80 is passed directly to the filter field 1502 via the distribution pipe 42. In another variation, the influent liquid 80 may be first stored in a tank, chamber, pipe or other storage vessel 1503 before being distributed into the filter field 1502 and the treatment system 1300 disposed therein. In one embodiment, the storage of the influent liquid 80 may be combined with a pre-treatment process at 1505 where metal, organic, non-organic additives are introduced into the influent liquid. The pre-treated flow of influent liquid then passes into and through the filter field 1502 and exists as treated influent liquid 80' from an outlet conduit 1506. The outlet conduit 1506 has a valve, gate or other flow control structure 1509 to allow the conveyance of between no flow, and full flow from the filter field 1502. Once the treated influent liquid 80' is discharged from the filter field it is collected and stored 1510 for use such as, for example, potable liquid (e.g., drinking water).

As shown in FIG. 15, the treated influent liquid 80', or portion thereof, can also be taken after discharge from the filter field 1502 and re-introduced at any part of the system via a feedback conduit 1507. The reintroduced treated influent liquid 80' may be augmented with mechanical or chemical admixtures such as air, carbon, potassium permanganate, or other organic or non-organic material at 1508. In one embodiment, a pump or other mechanical assistance can be used to circulate the flow back in the feedback loop back through the filter field 1502. In one embodiment, the feedback treated influent liquid 80' mixes with the influent liquid 80 being introduced to the filter field 1502 for the first time. In one embodiment, the treated influent liquid 80' is directed independently to the filter field 1502 or portion thereof such as, for example, directly to one or more of the elongated members 20. For example, the feedback loop 1507 may be provided as the external source 560 of liquid 206 to the modules 110 (FIG. 12).

Although this invention has been shown and described with respect to the detailed embodiments thereof, it will be understood by those of skill in the art that various changes may be made and equivalents may be substituted for elements and steps thereof without departing from the scope of the invention. In addition, modifications may be made to adapt a particular situation to the teachings of the invention without departing from the essential scope thereof. Therefore, it is intended that the invention not be limited to the particular embodiments disclosed in the above detailed description, but that the invention will include all embodiments falling within the scope of the above description.

What is claimed is:

1. A system for treating influent liquid, the system comprising:
a plurality of treatment modules including
an elongated member arranged in a predetermined configuration, the elongated member including a core structure wrapped in a fabric configured for the passage of the influent liquid therethrough, and
filter field medium disposed about open areas defined by the predetermined configuration of the elongated member, the medium configured for receiving the influent liquid from the elongated member and treating the influent liquid passing therethrough;
a bladder containing the plurality of treatment modules, the bladder having a first outlet for providing treated influent liquid; and
a distribution conduit coupled to the bladder, the distribution conduit having a second outlet for distributing the influent liquid to the elongated member, each of the plurality of treatment modules coupled to the distribution conduit to receive at least a portion of the influent liquid.

2. The treatment system of claim 1, wherein the plurality of treatment modules are arranged in one of a side-by-side arrangement and a vertically stacked arrangement.

3. A system for treating influent liquid, the system comprising:
a treatment module including,
an elongated member arranged in a predetermined configuration, the elongated member including a core structure wrapped in a fabric configured for the passage of the influent liquid therethrough, and
filter field medium disposed about open areas defined by the predetermined configuration of the elongated member, the medium configured for receiving the influent liquid from the elongated member and treating the influent liquid passing therethrough;
a bladder containing the treatment module, the bladder having a first outlet for providing treated influent liquid;
a distribution conduit coupled to the bladder, the distribution conduit having a second outlet for distributing the influent liquid to the elongated member;
a frame having a plurality of support members, adjacent support members retain the elongated member within the predetermined configuration, the frame comprised of at least one of a rigid and semi-rigid material wherein the rigid and semi-rigid material includes at least one of ferrous or non-ferrous wire, plastic, cellulose, timber, a plant-derived man-made fibrous substance, and petroleum or hydrocarbon based materials, at least a portion of the frame further comprised of an electrically conductive material.

4. The treatment system of claim 3, wherein the frame is comprised of a material that is detectable by a non-invasive above surface detector.

5. The treatment system of claim 3, further including an external source for providing an electrical current to at least a portion of the frame.

6. The treatment system of claim 3, further including electrically conductive elements coupled to the frame.

7. The treatment system of claim 3, wherein the frame includes at least one tubular portion, the tubular portion having an internal conduit, a side wall and at least one opening through the side wall, the internal conduit and the at least one opening delivering from an external source at least one of a gas, a liquid and a chemical to the frame and the influent liquid under treatment.

8. The treatment system of claim 7, wherein the external source, the internal conduit and the at least one opening provide means of recovery of at least one of the added gas, liquid and chemicals, and the influent liquid under treatment or portions thereof.

9. The treatment system of claim 7, further including a feedback conduit returning at least a portion of the treated influent liquid to the treatment module by the internal conduit of the tubular portion.

10. A system for treating influent liquid, the system comprising:
a treatment module including,
an elongated member arranged in a predetermined configuration, the elongated member including a core structure wrapped in a fabric configured for the passage of the influent liquid therethrough, and
filter field medium disposed about open areas defined by the predetermined configuration of the elongated member, the medium configured for receiving the influent liquid from the elongated member and treating the influent liquid passing therethrough;
a bladder containing the treatment module, the bladder having a first outlet for providing treated influent liquid;
a distribution conduit coupled to the bladder, the distribution conduit having a second outlet for distributing the influent liquid to the elongated member; and
a feedback conduit returning at least a portion of the treated influent liquid to the treatment module.

* * * * *